Nov. 26, 1929.  W. B. BRONANDER  1,737,295

FRICTION DRIVE REDUCTION GEARING

Filed Feb. 17, 1927  4 Sheets-Sheet 1

INVENTOR
Wilhelm B. Bronander
BY
Marshall M Hawley
ATTORNEYS

Nov. 26, 1929.  W. B. BRONANDER  1,737,295
FRICTION DRIVE REDUCTION GEARING
Filed Feb. 17, 1927  4 Sheets-Sheet 2

INVENTOR
Wilhelm B. Bronander
BY
Marshall & Hawley
ATTORNEYS

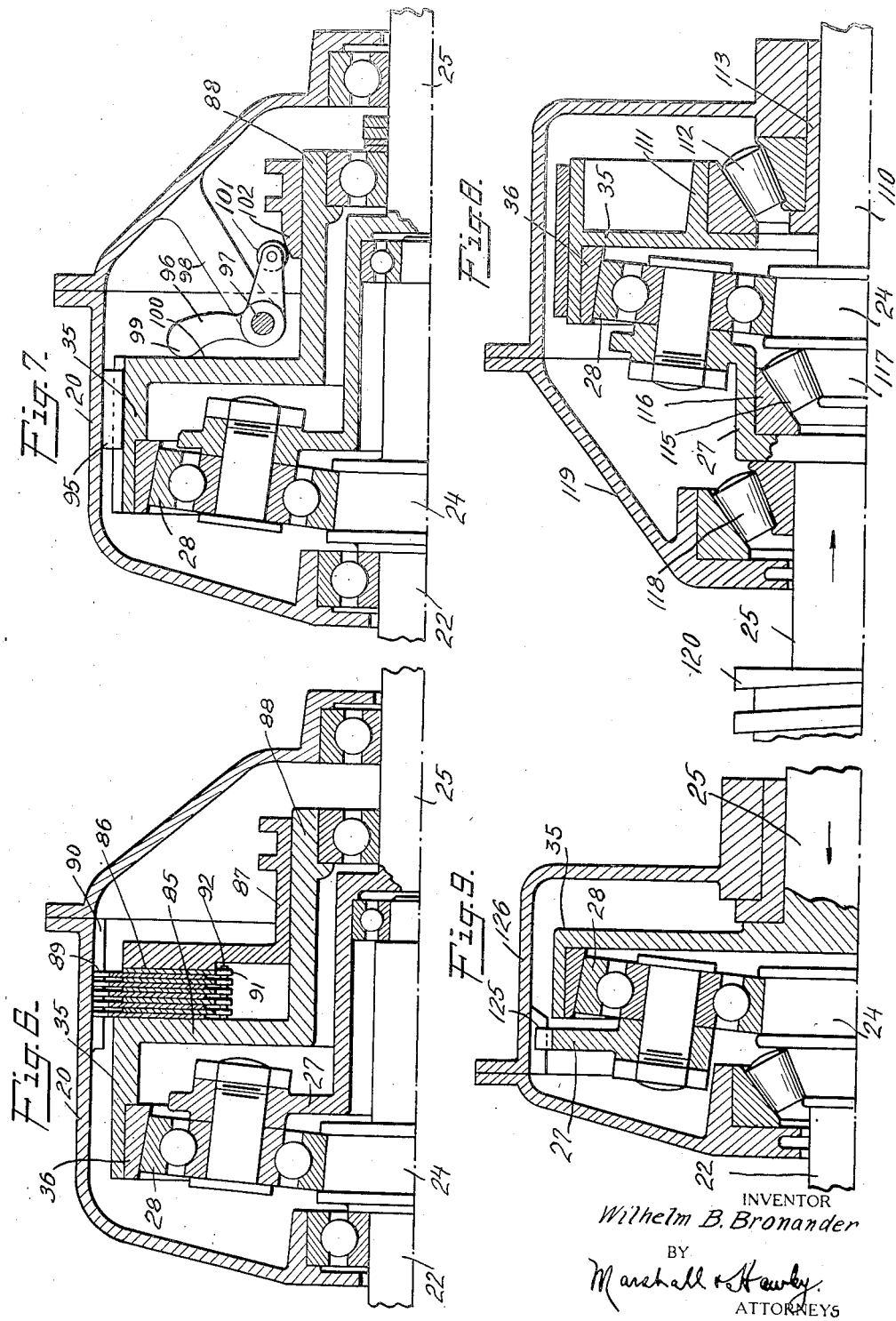

Nov. 26, 1929.                W. B. BRONANDER                1,737,295
FRICTION DRIVE REDUCTION GEARING
Filed Feb. 17, 1927            4 Sheets-Sheet 4
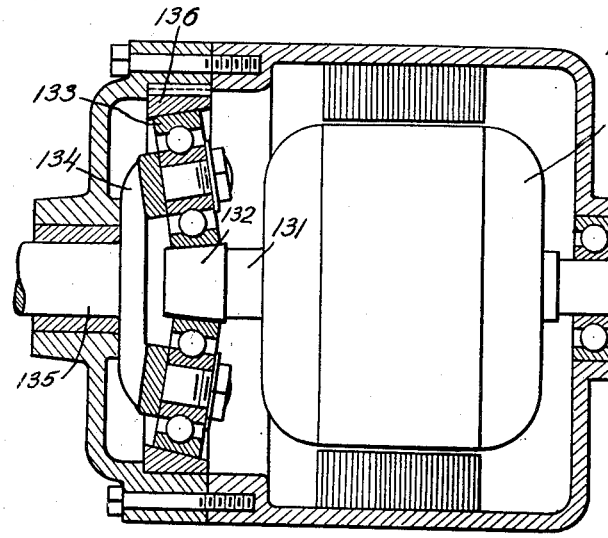
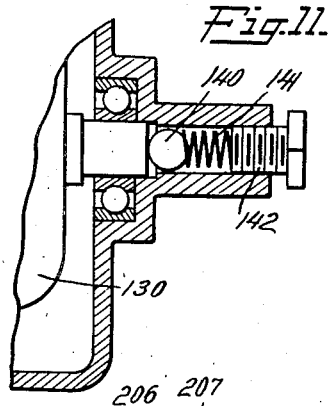
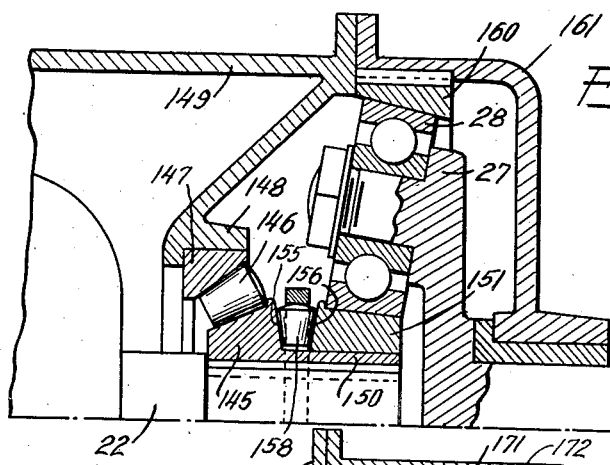
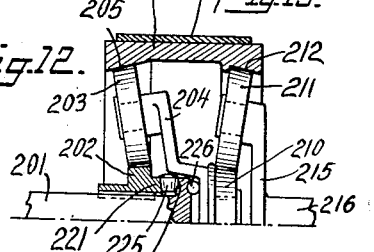
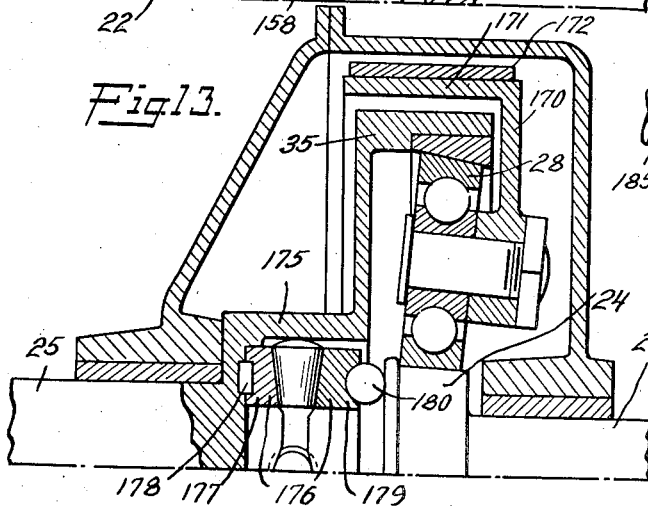
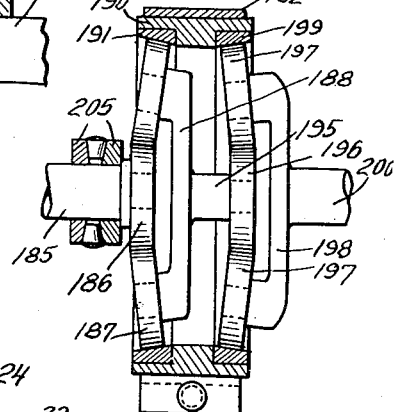
INVENTOR
Wilhelm B. Bronander
BY
Marshall & Hawley
ATTORNEYS Patented Nov. 26, 1929

1,737,295

UNITED STATES PATENT OFFICE

WILHELM B. BRONANDER, OF MONTCLAIR, NEW JERSEY

FRICTION-DRIVE REDUCTION GEARING

Application filed February 17, 1927. Serial No. 168,848.

This invention relates to transmission mechanism.

More specifically stated, the invention relates to reduction gearing particularly adapted for motor drives although not limited to such use.

The invention has for its salient object to provide reduction gearing that is simple and compact in construction, is efficient in operation and is inexpensive to manufacture.

Another object of the invention is to provide a reduction gearing so constructed and arranged that it fulfills the function of a clutch and no separate clutch mechanism is required.

Further objects of the invention will appear from the following specification taken in connection with the drawings, which form a part of this application, and in which Fig. 1 is a sectional elevation of one form of gearing constructed in accordance with the invention;

Fig. 6 is a sectional elevation illustrating one half of another form of gearing constructed in accordance with the invention;

Fig. 7 is a view similar to Fig. 6 but showing another modification of the invention;

Fig. 8 is a view similar to Fig. 6 but illustrating another embodiment of the invention;

Fig. 9 is a sectional elevation similar to Fig. 6 but showing a further modification of the invention;

Fig. 10 is a sectional elevation showing reduction gearing constructed in accordance with the invention and connected directly to a motor shaft;

Fig. 11 is a detail sectional elevation showing means for creating a thrust on the motor shaft to force the friction gears into frictional driving engagement;

Figs. 12 and 13 are views similar to Fig. 6 but illustrating still further embodiments of the invention;

Fig. 14 is a sectional elevation somewhat schematic showing another embodiment of the invention; and Fig. 15 is a half section similar to Figs. 6 to 9 inclusive but showing a further embodiment of the invention.

Figure 1:
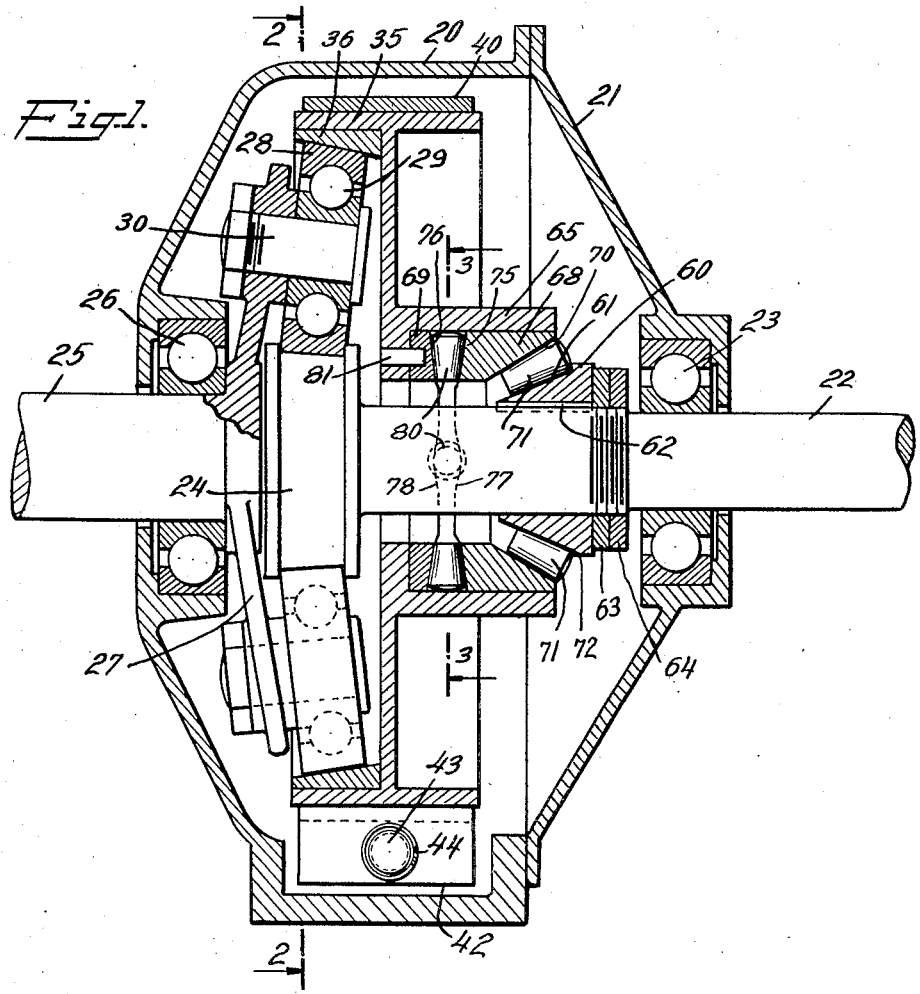

The invention briefly described consists of reduction gearing comprising frictional planetary gearing elements. The pinion, planet gears and ring gear are all friction gears and in each of the embodiments of the invention, means is provided for placing these friction gears in frictional driving engagement with each other. In order to transmit the drive from the motor or other driving element, one of the planetary friction gears is driven, one of the elements is held against rotation and the drive is taken from the third. For instance, in certain forms of the invention, the friction pinion is connected to the drive shaft, the friction ring is held against rotation and the drive is taken from the spider having thereon friction planet gears. Further details of the invention will appear from the following description.

*Description of structure shown in Figs. 1 to 5 inclusive*

In the embodiment of the invention illustrated in Figs. 1 to 4 inclusive, there is shown a casing comprising sections 20 and 21 and enclosing the planetary gearing. The drive shaft or motor shaft 22 is mounted in ball bearings 23 and extends into the casing and has a friction pinion 24 secured to the inner end thereof.

The driven shaft 25 is mounted in ball bearings 26 and is connected to a spider 27 having friction planet gears 28 mounted thereon. The friction gears 28 are mounted on ball bearings 29 carried by studs 30 secured to the spider arms.

It will be noted that the friction pinion 24 and the friction planet gears 28 are conical in shape.

A ring gear 35 surrounds the planet gears 28 and has a conical internal driving surface 36 engaging the planet gears 28. A band 40 surrounds the outer surface of the ring gear and has laterally extending end portions 41 and 42 having studs 43 thereon on which there is mounted an expansion spring 44. The extension 41 engages an adjustable set screw 45 threaded into a lug 46 carried by the casing 20 and a lock nut 47 is mounted on the set screw to lock the screw in adjusted position.

The extension 42 is engaged by a slidable pin 50 which is actuated by a bell crank lever 51 pivoted on a lug 52 carried by the casing 20. The bell crank lever is held in any desired position of adjustment by a pawl 53 which engages a ratchet or rack 54 and is controlled by a lever 55. A spring 56 holds the pawl in engagement with the rack and the lever 55 is used to release the pawl. By means of the pin control mechanism just described, the amount of friction of the band 40 on the outer surface of the ring gear can be regulated.

Figure 4:
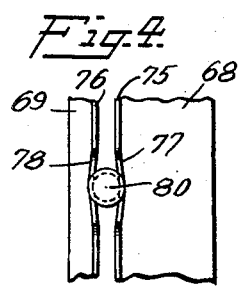
Fig. 4 is a detail elevation partly broken away showing one of the thrust transmitting rollers and the rings engaged thereby.
Figures 2, 3:
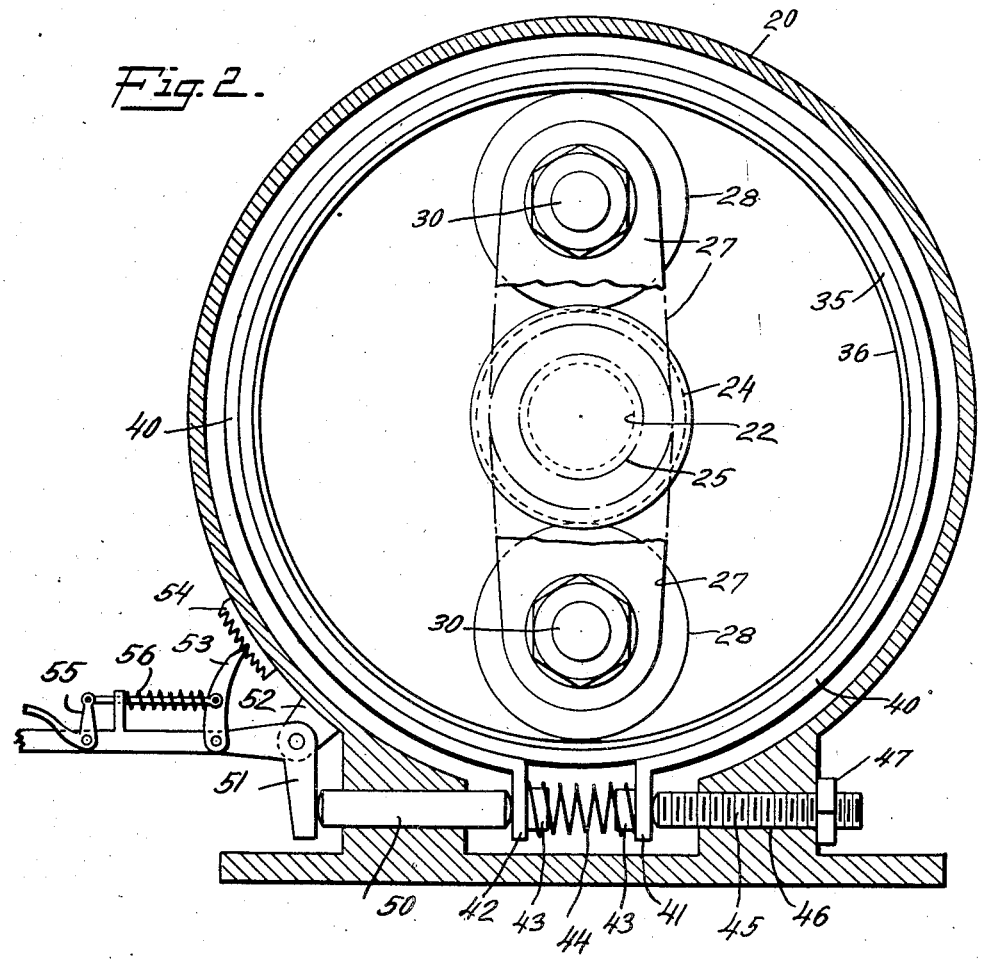
Fig. 2 is a sectional elevation taken substantially on line 2—2 of Fig. 1.
Fig. 3 is a sectional elevation taken substantially on line 3—3 of Fig. 1.

The following means is provided for forcing the various friction gear elements into frictional driving engagement with each other when the drive shaft 22 is rotated. A sleeve 60 having a conical outer surface 61 is keyed as shown at 62 to the shaft 22 and is adjustable on the shaft by means of a nut 63 and is held in adjusted position by a lock nut 64. The ring gear 35 has a hub 65 in which are mounted a pair of rings 68 and 69. The ring 68 has a conical annular surface 70 and tapered rollers 71 are mounted between the conical outer surface 61 of the sleeve 60 and the conical annular surface 70 of the ring 68. A shoulder 72 on the sleeve 60 retains the rollers in position. The ring 68 also has a conical surface 75 and ring 69 has a corresponding and opposing conical surface 76. The surfaces 75 and 76 are not true conical surfaces but have enlarged portions 77 and 78 as shown in Figs. 3 and 4. In these enlarged portions are positioned conical rollers 80. The ring 68 is fixed within the hub of the ring gear in any suitable manner as by a pin 81.

Figure 5:
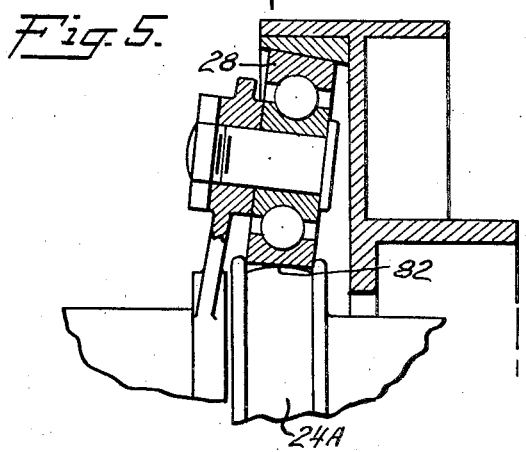
Fig. 5 is a fragmentary view of a construction similar to that illustrated in Fig. 1, but showing a slightly different form of friction pinion.

The structure shown in Fig. 5 is the same as that illustrated in Figs. 1 to 4 inclusive except that the friction pinion 24A shown in Fig. 5 has a spherical surface 82 instead of a conical outer surface as in the preceding figures. This, of course, will give a line contact for the friction planet gears 28.

*Operation of structure shown in Figs. 1 to 5 inclusive*

When the shaft 22 is rotated, the sleeve 60 will be rotated, thus rotating the rollers 71 and ring 68. When the ring 68 is rotated in either direction, the rollers 80 will tend to move into the restricted portions of the opposed surfaces 75 and 76 and this will cause the ring gear to move toward the left, viewing Fig. 1, thus moving the conical portion 36 of the ring gear into driving engagement with the planet gears.

The rotation of the shaft 22 will also rotate the friction pinion 24 which in turn will rotate the planet gears and spider.

Since the ring gear is held against rotation by the brake band 40, the rotation of the pinion 24 will cause a rotation of the spider at a reduced speed.

*Description of structure shown in Fig. 6*

In Fig. 6, the drive or motor shaft 22 has a friction pinion 24 mounted thereon as in the preceding embodiments of the invention. The friction planet gears 28 are carried by spider 27 and the spider is connected to the driven shaft 25.

The ring gear 35 has a conical friction surface 36 engaged by the friction planet gears 28 but in this form of the invention, a disk portion 85 of the ring gear is held against rotation by a disk clutch 86 which in turn is controlled by a clutch member 87 mounted on the hub 88 of the ring gear. The disks 89 of the clutch 86 are keyed as shown at 90 to the casing section 20 to prevent rotation thereof and the disks 91 of the clutch are carried by the ring gear as shown at 92.

*Operation of the structure shown in Fig. 6*

The device shown in Fig. 6 functions in substantially the same manner as that shown in Figs. 1 to 5. When the disk clutch is moved to a position to hold the ring gear 35 from rotation, the drive will be transmitted from the friction pinion through the friction planet gears to the spider 27 and thus to the shaft 25. It will be obvious that the clutch can be thrown in gradually, if desired.

*Description and operation of structure shown in Fig. 7*

In this figure, the ring gear 35 is splined as shown at 95 to the section 20 of the casing, thus preventing rotation thereof. The friction engagement between the ring gear and the planet gears is obtained in this instance by bell crank levers 96 pivoted at 97 to a bracket 98 carried by the casing. These levers as shown at 99 engage the disk portion 100 of the ring gear and at their opposite ends are provided with rollers 101 which are engaged by a cam 102 mounted on the hub 88 of the ring gear. As the cam 102 is moved on the hub 88, the levers 96 will be caused to swing in an anti-clockwise direction, viewing Fig. 7, thus causing the ring gears to be moved toward the left and into frictional engagement with the friction planet gears 28.

Description and operation of structure shown in Fig. 8

In Fig. 8, the drive shaft 110 has connected thereto friction pinion 24. The ring gear 35 has its hub 111 mounted in a roller bearing 112 supported by a sleeve 113 surrounding the drive shaft 110. The spider 27 is connected to the driven shaft 25 and has friction planet gears 28 meshing with a conical ring 36 carried by the ring gear. A roller bearing 115 is mounted between a conical ring 116 mounted within the spider and a conical friction gear 117 carried by and connected to rotate with the friction pinion 24. The driven shaft 25 is also mounted in the roller bearing 118 disposed within the casing section 119. In this form of the invention, the driven shaft 25 has a worm 120 formed thereon. This worm will create a thrust toward the right, viewing Fig. 8, thus forcing the planet pinions into firm driving engagement with the ring gear.

Description and operation of structure shown in Fig. 9

In the form of the invention illustrated in Fig. 9, the drive shaft 22 has friction pinion 24 connected thereto as in the preceding embodiments, but the ring gear 35 in this case is connected to the driven shaft 25. The spider 27 is held against rotation, being splined as shown at 125 to the section 126 of the casing. In this case, the pinion 24 will be rotated by the drive shaft and the planet gears 28 will be rotated by the pinion. The spider, however, is held against rotation and, therefore, the ring gear 35 will be rotated, thus rotating the driven shaft 25 to which it is connected in a direction opposite to the direction of rotation of the shaft 22.

Description and operation of structures shown in Figs. 10 and 11

In Fig. 10 there is shown a motor 130 having a shaft 131 to which is secured a friction pinion 132. The pinion 132 meshes with friction planet gears 133 carried by spider 134 secured to the driven shaft 135. The friction planet gears 133 also mesh with a stationary ring gear 136.

It is well known that the field currents in a motor if not balanced to prevent a solenoid action will tend to give the armature and armature shaft an end thrust in one direction or the other. In this embodiment of the invention, it is proposed to so design the field that a slight end thrust will be given toward the left viewing Fig. 10, thus forcing the friction pinion 132 into firm driving engagement with the friction planet gears 133.

If desired, this end thrust may be obtained by providing a ball thrust bearing 140 at one end of the motor shaft as shown in Fig. 11, the ball being actuated by a spring 141 and the compression of the spring being controlled by a threaded plug or set screw 142.

Description and operation of structure shown in Fig. 12

In this embodiment, the motor or drive shaft 22 has splined thereon a conical ring 145 surrounded by rollers 146 mounted within a conical ring 147 carried by a bearing 148 secured to the casing 149. The conical ring 145 has a sleeve extension 150 on which is rotatably mounted a conical friction pinion 151. The ring 145 and friction pinion 151 have surfaces 155 and 156 formed somewhat similar to the surfaces 77 and 78 shown in Figs. 1 and 4. Conical rollers 158 are disposed between the surfaces 155 and 156 and are adapted to transmit the drive from the ring 145 to the pinion 151.

The friction planet gears 28 are carried by the spider 27 connected to the driven shaft 25. The friction planet gears 28 mesh with the pinion 151 and also with ring gear 160 carried by section 161 of the casing.

This structure operates as follows. When the shaft 22 is rotated, the rotation of the conical ring 145 will cause the rollers 158 to tend to move into the restricted portions of the surfaces 155 and 156, thus forcing the pinion 151 into frictional driving engagement with the planet gears 28. As the ring gear 160 is held against rotation, the spider 27 will be rotated by the planet gears, thus rotating the driven shaft 25.

Description and operation of structure shown in Fig. 13

In this embodiment of the invention, the drive shaft 22 has mounted thereon the friction pinion 24. Friction planet gears 28 are carried by spider 170 which in this instance has an annular flange 171 engaged by a brake band 172 similar to the brake band 40 shown in Fig. 2. The ring gear 35 is connected to the driven shaft 25 and there is positioned within the hub 175 of the ring gear, a clutch 176 similar to that shown in Figs. 1 and 4. One ring 177 of the clutch is connected to rotate with the driven shaft as shown at 178. There is positioned between the other ring 179 of the clutch, a ball thrust bearing 180 which engages the outer surface or outer face of the pinion 24. This will cause the necessary frictional driving engagement between the pinion and planet gears in the manner hereinbefore described.

Description and operation of structure shown in Fig. 14

In this form of the invention, the motor shaft 185 has mounted thereon a pinion 186 meshing with friction planet gears 187 carried by a spider 188. The planet gears also mesh with a ring gear 190 having a friction conical surface 191. The ring gear is surrounded by a brake band 192 similar to the brake band 40 shown in Fig. 2.

The spider 188 has a stub shaft 195 connected thereto on which is mounted a friction pinion 196 which meshes with friction planet gears 197 carried by a second spider 198. The gears 197 also mesh with a friction conical surface or ring 199 carried by the ring gear 190. The driven shaft 200 is carried by the spider 198.

The necessary thrust to give the frictional driving engagement between these parts may be obtained by means of a roller clutch 205 similar in construction to that shown in Figs. 1 and 4 and the details of this construction need not be further described.

By means of the gearing illustrated in Fig. 14, it will be evident that a double reduction can be obtained.

*Description and operation of structure shown in Fig. 15*

In this embodiment of the invention, the drive shaft 201 as splined thereon a friction pinion 202 which meshes with friction planet gears 203 carried by a spider 204. The planet gears 203 also mesh with a conical surface 205 of a ring gear 206 surrounded by a brake band 207 operated in the manner hereinbefore described.

The spider 204 also has secured thereto a friction pinion 210 which meshes with friction planet gears 211 which in turn mesh with a conical friction surface 212 of the ring gear 206. The planet gears 211 are carried by a spider 215 which has secured thereto a driven shaft 216.

The shaft 201 has secured to or mounted on the inner end thereof a flange or collar 220 having a conical surface with enlarged portions similar to the structure illustrated in Figs. 3 and 4. A collar or flange 221 is formed on the friction pinion 202 and has conical surfaces opposed to the conical surfaces on the flange 220 and constructed in the manner shown in Figs. 3 and 4. The conical rollers 225 are interposed between opposed surfaces of the flanges 220 and 221 and tend to force these flanges apart upon the rotation of the shaft 201 in the manner already described. A ball thrust bearing 226 is interposed between the flange 220 and the pinion 210. This causes the friction pinion 202 to frictionally engage the planet gears 203 and also tends to force the pinion 201 into frictional engagement with planet gears 211. In other words, an end thrust is set up on the pinions causing these pinions to frictionally engage the parts in contact therewith.

It will be evident that the structure shown in Fig. 15 will give a double reduction similar to that obtained by the drive shown in Fig. 14.

From the foregoing description it will be seen that a simple, compact and practical form of reduction gearing has been designed and that this gearing will operate efficiently and can be manufactured economically.

Although certain specific embodiments of the invention have been particularly shown and described, it will be understood that the invention is capable of modification and that changes in the construction and in the arrangements of the various cooperating parts may be made without departing from the spirit or scope of the invention, as expressed in the following claim.

What I claim is:

Transmission mechanism comprising a drive shaft, a driven shaft, friction planetary gears operatively connecting one of said shafts to the other shaft, said planetary gears comprising a conical friction pinion connected to the drive shaft, a spider connected to the driven shaft and having conical friction planet gears engaging the friction pinion, a friction ring gear having an internal conical surface in frictional engagement with the planet gears, means for holding one of the movable planetary gear elements against rotation, and means operative to move the friction gear elements into tight, frictional, wedging and driving relation when said drive shaft is rotated, comprising a thrust member carried on one of said shafts and a reaction member fixed to one of said planetary gear elements, and a tapered roller element located between said members for imparting longitudinal movement to said reaction member.

In witness whereof, I have hereunto set my hand this 30th day of December, 1926.

WILHELM B. BRONANDER.